US012639125B2

(12) United States Patent
Whatmough et al.

(10) Patent No.: US 12,639,125 B2
(45) Date of Patent: May 26, 2026

(54) CURRENT SPIKE MITIGATION TECHNIQUE FOR NEURAL NETWORKS

(71) Applicant: Arm Limited, Cambridge (GB)

(72) Inventors: Paul Nicholas Whatmough, Cambridge, MA (US); Shidhartha Das, Upper Cambourne (GB)

(73) Assignee: Arm Limited, Cambridge (GB)

( * ) Notice: Subject to any disclaimer, the term of this patent is extended or adjusted under 35 U.S.C. 154(b) by 955 days.

(21) Appl. No.: 17/697,706

(22) Filed: Mar. 17, 2022

(65) Prior Publication Data

US 2023/0297432 A1      Sep. 21, 2023

(51) Int. Cl.
*G06F 9/46* (2006.01)
*G06F 9/50* (2006.01)
*G06N 3/02* (2006.01)

(52) U.S. Cl.
CPC .............. *G06F 9/505* (2013.01); *G06N 3/02* (2013.01)

(58) Field of Classification Search
CPC ................................... G06F 9/505; G06N 3/02
See application file for complete search history.

(56) References Cited

U.S. PATENT DOCUMENTS

| | | | |
|---|---|---|---|
| 6,304,978 | B1 | 10/2001 | Horigan et al. |
| 7,861,068 | B2 | 12/2010 | Gorbatov et al. |
| 10,620,954 | B2 | 4/2020 | Beard et al. |
| 11,436,145 | B1 | 9/2022 | Narigapalli et al. |
| 2003/0055969 | A1 | 3/2003 | Begun et al. |
| 2007/0220293 | A1 | 9/2007 | Takase |
| 2011/0320150 | A1 | 12/2011 | David et al. |
| 2016/0239065 | A1 | 8/2016 | Lee et al. |
| 2018/0300605 | A1 | 10/2018 | Ambardeka et al. |
| 2019/0187775 | A1 | 6/2019 | Rotem et al. |
| 2019/0205358 | A1 | 7/2019 | Diril et al. |
| 2019/0250691 | A1 | 8/2019 | Lee et al. |
| 2019/0258306 | A1 | 8/2019 | Croxford |
| 2019/0340491 | A1 | 11/2019 | Norden et al. |
| 2019/0370086 | A1 | 12/2019 | Heilper et al. |
| 2020/0175338 | A1 | 6/2020 | Croxford et al. |
| 2021/0019633 | A1 | 1/2021 | Venkatesh |
| 2021/0103550 | A1 | 4/2021 | Appu et al. |
| 2023/0079975 | A1 | 3/2023 | Saeed et al. |

*Primary Examiner* — Gregory A Kessler
(74) *Attorney, Agent, or Firm* — Pramudji Law Group PLLC; Ari Pramudji

(57)      ABSTRACT

Various implementations described herein are related to a method that monitors workloads of a neural network for current spikes. The method may determine current transitions of the workloads that result in rapid changes in load current consumption of the neural network. The method may modify load scheduling of the neural network so as to smooth and/or stabilize the current transitions of the workloads.

12 Claims, 8 Drawing Sheets

<u>600</u>

100

System-on-a-Chip (SoC) Circuitry 104

300

Convolutional Neural Network Operation 304

400

Metadata Processing Circuitry 404

500

Power Management Policy Control Circuitry 504

600

610 schedule graph with minimum latency 614 simulate scheduled graph to identify potential changes in load current 618 di/dt likely?

No → 620 schedule graph as normal

Yes ↓ 624 modify scheduling to smooth-out changes in current consumption 628 deploy optimized graph to mitigate supply droops

700

800

CURRENT SPIKE MITIGATION TECHNIQUE FOR NEURAL NETWORKS

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In modern circuit designs, performance of digital circuitry is typically dependent on power management. Powering a high-performance digital circuit typically demands a dedicated power-management circuit that controls the amount of power supplied and/or limits the activity of the digital circuitry to ensure that the amount of power available is not exceeded. Also, power management may assist with the thermal management of digital circuitry so as to ensure that a device does not exceed a temperature threshold, and that a maximum operational temperature of the device is not exceeded.

Some digital circuitry is used for processing data and/or instructions for neural networks, wherein neural network (NN) workloads are typically compute bound, and when processed on digital circuitry, NN workloads easily generate large current spikes resulting from substantially high utilization of compute units. If left unchecked, these current spikes may result in catastrophic voltage droops on-chip and logical errors. Thus, there exists a need to improve power management of digital circuitry when processing NN workloads so as to maintain power despite changing line and load conditions.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Figure 1:
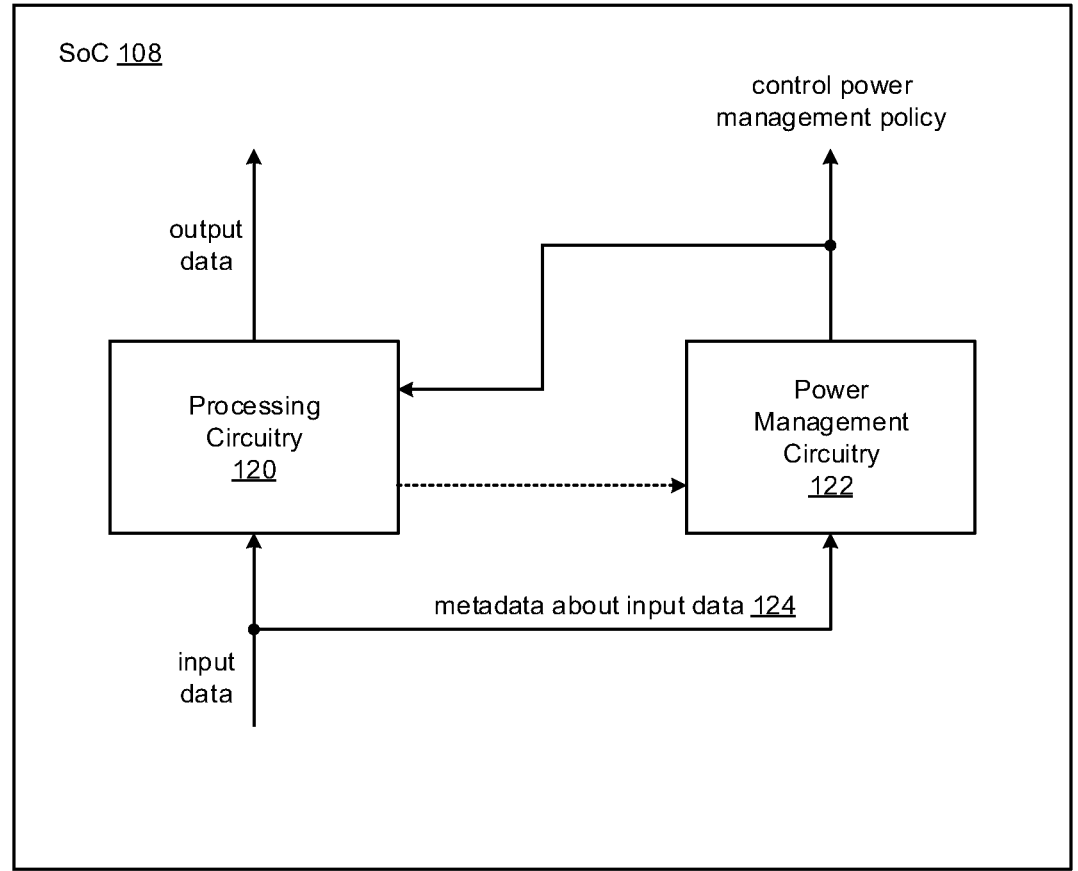
FIGS. 1-2 illustrate various diagrams of system-on-a-chip (SoC) circuitry in accordance with various implementations described herein.

Various implementations described herein are directed to various current spike mitigation schemes and techniques for neural networks in physical circuit designs. When processing neural network (NN) workloads, digital processing circuitry may generate large current spikes resulting from extreme utilization of computational units, and these current spikes may result in catastrophic failures, voltage droops and/or logical errors. To prevent this, various implementations described herein provide a method to analyze the NN graph ahead of time to determine transitions between operation and/or instructions nodes that may result in rapid changes in current consumption. In some scenarios, additional nodes may be inserted at these points to smooth the current transitions.

In various implementations, neural network (NN) workloads are compute bound and spend a majority of execution time processing parallel GEMM kernels (General Matrix Multiplication kernels). Therefore, NNs may be readily accelerated in hardware by adding additional compute units so as to process NN workloads more quickly. This is true in case of neural processing units (NPUs) and also with central processing units (CPUs), graphic processing units (GPUs) and digital signal processing units (DSPs). In some instances, these specialized hardware units achieve high utilization for various NN workloads and subsequently generate high current consumption. In various scenarios, when utilization increases or decreases rapidly, there may be a corresponding step or spike in the current consumption. In turn, these current steps or spikes may generate supply voltage droop events, that may be referred to as di/dt events, which arise due to finite complex supply network impedance. If left unchecked, the supply voltage droop events (i.e., dI/dt events) may cause significant logic errors, if the supply voltage drops too low.

In various implementations, neural network (NN) workloads may be structured as graphs with nodes representing operations and/or instructions, such as convolutions, and edges representing activation tensors. In some scenarios, especially on NPUs, these graphs are scheduled ahead of time to efficiently run on target hardware. This scheduling operation involves deciding the order to schedule parallel nodes and allocating buffers for storage of intermediate results. This scheduling may be driven primarily by latency. Here, in the present disclosure, this scheduling may be ahead of time (static), but alternatively, this scheduling may be performed at runtime (dynamic), e.g., in a device driver.

Various implementations described herein provide for current spike mitigation techniques to prevent supply droop: static scheduling and dynamic scheduling. In various implementations, static scheduling utilizes an off-line characterization of the graph (or NN workloads) so as to identify potential voltage droop events and subsequently modify the graph to mitigate these droop events. Also, in other implementations, dynamic scheduling monitors current demand during execution of the graph (or NN workloads) and utilizes this information to modify graph scheduling to mitigate potential droop events.

Various implementations of current spike mitigation schemes and techniques will be described in greater detail herein with reference to FIGS. 1-8.

FIG. 1 illustrates a schematic diagram 100 of system-on-a-chip (SoC) circuitry 104 in accordance with various implementations described herein.

In some implementations, the SoC circuitry 104 may refer to a system or device having various integrated circuit (IC) components that are arranged and coupled together as an assemblage or some combination of parts that provide for physical circuit design and related structures. In some instances, a method of designing, providing and building SoC circuitry 104 as an integrated system or device that may be implemented with various IC components is described herein so as to thereby implement various neural networking schemes and techniques associated therewith. The SoC circuitry 104 may be integrated with processing circuitry and related components on a single chip, and the SoC circuitry 104 may be implemented in various embedded systems for automotive, electronic, mobile and Internet-of-things (IoT) applications, including remote sensor nodes.

As shown in FIG. 1, the SoC circuitry 104 may refer to SoC device 108 having processing circuitry 120 and power management circuitry 122. The processing circuitry 120 may receive input data, process the input data, and then generate output data based on the input data. The power management circuitry 122 may be configured to control the processing circuitry 120, e.g., by way of a power management policy for at least a portion of the SoC 108. For instance, the SoC 108 may include a number of power domains, and the power management circuitry 122 may be configured to control a power management policy for a specific power domain (with other separate power management circuitry being provided for controlling other power domains). In other instances, the power management circuitry 122 may be configured to the control power management policy for the SoC 108 as a whole. Also, in some instances, control signals that influence the power management policy may be issued by the power management circuitry 122 to various parts of the SoC 108, including, e.g., to the processing circuitry 120. For some of the power management functions, various decisions on the power management policy may be made by the power management circuitry 122 based on metadata 124 indicative of one or more properties of the input data to be processed by the processing circuitry 120. By receiving information about the specific input data to be processed, the power management circuitry 122 may be configured to match expected power requirements predicted to arise when processing the input data with the available power supply. Optionally, power management decisions may be dependent on various other information, such as, e.g., information obtained from the processing circuitry 120 (e.g., information related to the occurrence of various power hungry events as described in greater detail herein below).

In various implementations, the SoC circuitry 104 may refer to a device having processing circuitry 120 and power management circuitry 122. The processing circuitry 120 may be configured to execute workloads for the neural network (NN), and the power management circuitry 122 may be configured to monitor workloads of the neural network for current spikes (and/or other di/dt events). The power management circuitry 122 may determine current transitions of the workloads that result in rapid changes in load current consumption of the neural network. In addition, the power management circuitry 122 may modify load scheduling of the neural network so as to smooth and/or stabilize the current transitions of the workloads. Further, the power management circuitry 122 may schedule workloads with minimal latency as an optimization goal by generating the load scheduling of the neural network, and the power management circuitry 122 may simulate execution of the neural network so as to identify rapid changes in load current by executing the load scheduling of the neural network. Also, the power management circuitry 122 may stabilize the rapid changes in the load current consumption so as to reduce supply droop events of input voltage applied to the neural network.

In some implementations, the power management circuitry 122 may schedule workloads of the neural network with minimal latency and with rapid load current spikes by generating the load scheduling of the neural network, and also, the power management circuitry 122 may simulate execution of the neural network by identifying latency-driven scheduling choices with an alternative load scheduling that may avoid a given load current consumption step without significantly increasing latency. Also, the workloads may refer to workload operations, wherein alternative load scheduling provides the neural network with dummy operations inserted between workload operations so as to provide controlled and predictable load current consumption to the neural network. Also, the insertion of the dummy operations is achieved by performing dummy workload operations or by invoking explicit hardware features for the dummy operations.

Figure 2:
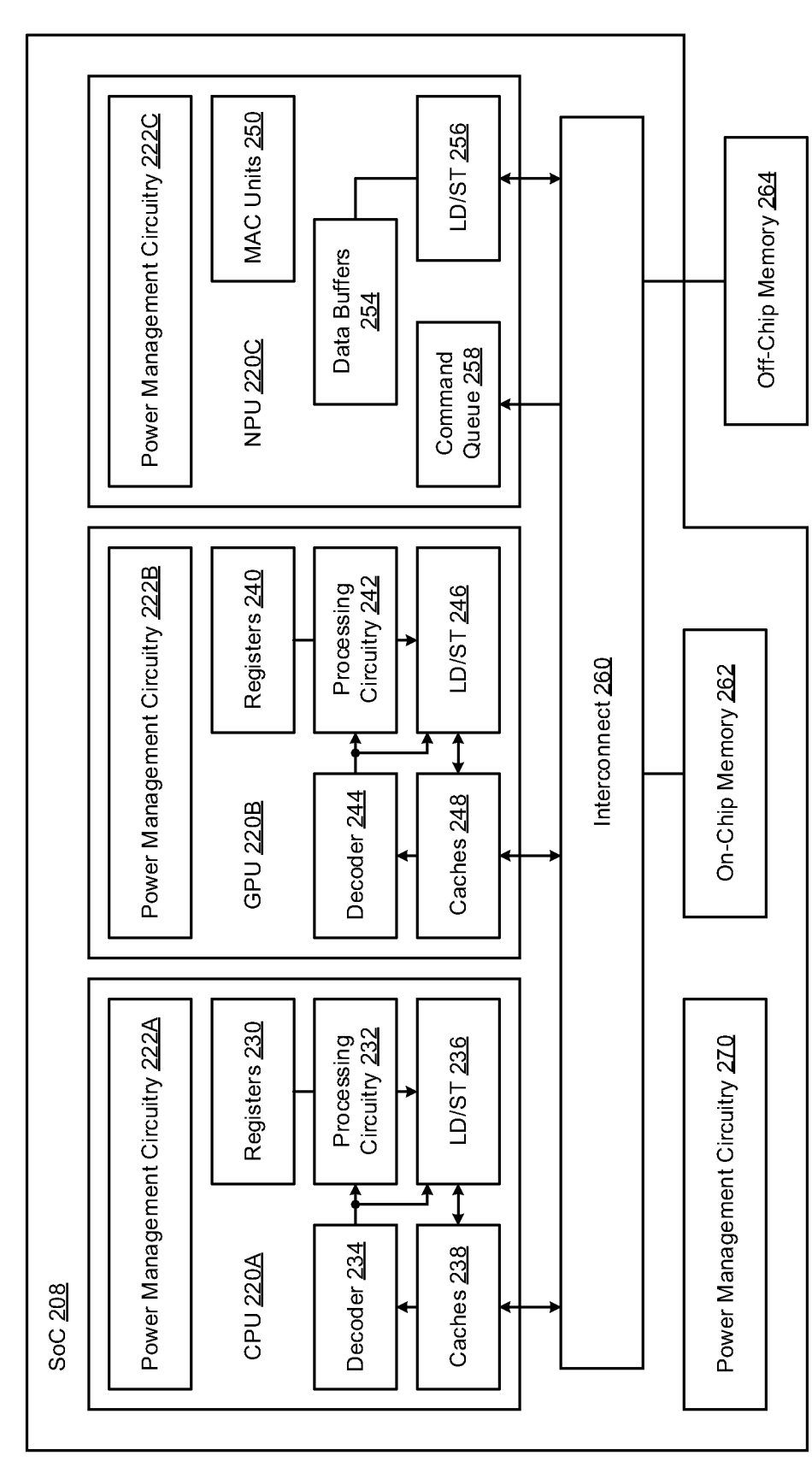

FIG. 2 illustrates a schematic diagram 200 of system-on-a-chip (SoC) circuitry 204 in accordance with various implementations described herein. FIG. 2 shows a more detailed implementation of the SoC circuitry 104 shown in FIG. 1. FIGS. 1-2 provide schematic diagrams showing selected components of the SoC, and the SoC circuitry 204 in FIG. 2 may have various other components not shown in FIG. 1.

In some implementations, the SoC circuitry 204 may refer to a system or device having various integrated circuit (IC) components that are arranged and coupled together as an assemblage or some combination of parts that provide for physical circuit design and related structures. In some instances, a method of designing, providing and building SoC circuitry 204 as an integrated system or device that may be implemented with various IC components is described herein so as to thereby implement various neural networking schemes and techniques associated therewith. The SoC circuitry 204 may be integrated with processing circuitry and related components on a single chip, and the SoC circuitry 204 may be implemented in various embedded systems for automotive, electronic, mobile and Internet-of-things (IoT) applications, including remote sensor nodes.

As shown in FIG. 2, the SoC circuitry 204 may refer to SoC device 208 having various processing circuitry, including, e.g., central processing unit (CPU) 220A, graphics processing unit (GPU) 220B and neural processing unit (NPU) 220C. Any one or more of the processing units 220A, 220B, 220C may be implemented as the processing circuitry 120 shown in FIG. 1. It should be appreciated that while FIG. 2 shows the SoC having all of the CPU 10, GPU 12 and NPU 14, this is not essential and other instances may only have one or more of these types of processing units. References to processing circuitry below may refer to any of the processing units 220A, 220B, 220C. Also, some SoCs may have multiple processing units of any given type (e.g., multiple CPUs 220A, multiple GPUs 220B, and/or multiple NPUs 220C), or various combinations thereof.

In some implementations, processing units 220A, 220B, 220C may be coupled to an interconnect 260 that controls access to shared memory by the processing units 220A, 220B, 220C. The shared memory may include on-chip memory storage 262 that may be included within the SoC 208 (i.e., on the same integrated circuit as the processing units 220A, 220B, 220C), as well as off-chip memory storage 264 that may be external to the SoC 208 (i.e., on a separate and/or external integrated circuit).

In some implementations, the CPU 220A may be a processing unit designed to support general purpose processing operations based on instructions defined according to an instruction set architecture. The CPU 220A may utilize an instruction decoder 234 that decodes instructions fetched from caches 238 or from the memory system. Based on the decoded instructions, the instruction decoder 234 may control processing circuitry 232 to perform data processing operations on operands obtained from registers 230 and then write results back to the registers 230. Also, for load/store instructions decoded by the instruction decoder 234, the instruction decoder 234 may control a load/store unit 236 to perform load operations to load data from the memory system (including the caches 238 and memory storage 262, 234) to the registers 230 or store operations to store data from the registers 230 to the memory system 238, 262, 264. Compared to the GPU 220B and NPU 220C, the CPU 220A may support a wider range of processing operations but may have fewer resources for executing as many operations in parallel, and the CPU 220A may be less efficient than the GPU 220B or the NPU 220C for particular workloads for which the GPU 220B or the NPU 220C are more optimized.

In some implementations, similar to the CPU 220A, the GPU 220B may include processing circuitry 242, an instruction decoder 244, caches 248, registers 240, and also a load/store unit 246. However, the components of the GPU 220B may be more optimized for performing graphics processing, such as, e.g., shading and rendering operations. Also, any known GPU design may be used for the GPU 220B.

In some implementations, the NPU 220C may refer to a hardware accelerator provided for accelerating machine learning workloads, such as, e.g., neural networks (NN) and convolutional neural networks (CNN). In some instances, much of the computational overhead of a NN/CNN is in matrix multiplication operations that may be decomposed into a number of multiply-accumulate (MAC) operations. Thus, the NPU 220C may include a number of MAC units 250 for performing multiply-accumulate operations, and also, there may be a large number of these MAC units 250 provided in parallel to enable high volume processing of data in parallel. The NPU 220C may have a command queue 258 to which the CPU 220A sends NPU configuration commands via the interconnect 260. The NPU configuration commands may refer to memory mapped commands that are used to issue a particular command to the NPU 220C. Also, the CPU 220A may execute a driver that performs a store operation using the load/store unit 236, where the address of the store request refers to an address allocated for commands for the NPU 220C, and where the store data to be written in association with a store request may represent the encoding of the command to be acted upon by the NPU 220C. In various instances, the commands may be defined to set parameters within configuration registers of the NPU 220C so as to control operations performed by the NPU 220C, or to define addresses of data within the memory system 262, 264 that is processed by the NPU 220C, or to represent start/stop commands for triggering the NPU 220C to start or stop processing of a certain amount of input data associated with a particular machine learning model. The NPU 220C may have various data buffers 254 for caching data local to the NPU 220C, input data read from the memory system, or for storing output of the MAC units 250 that serve as further inputs to later MAC operations. The NPU 220C may include load/store unit 256 that is responsible for controlling transfer of data between the memory system 262, 264 and the data buffers 254 of the NPU 220C. In other implementations, the NPU 220C itself may include a CPU (or similar processor) that controls operation of the NPU 220C under the control of a driver program executed on the CPU 220A.

In some implementations, the power management circuitry 122 in FIG. 1 may be implemented in a distributed manner, wherein one or more of the processing units 220A, 220B, 220C of the SoC 208 have local power management units. For instance, as shown in FIG. 2, the CPU 220A may have power management circuitry 222A, the GPU 220B may have power management circuitry 222C, and the NPU 220A may have power management circuitry 222C. Also, the SoC 208 may have power management circuitry 270 that may or may not be in communication with one or more of the power management units 222A, 222B, 222C. Therefore, the power management circuitry 122 in FIG. 1 may be distributed across the SoC 208 within a number of local blocks, wherein the local power management circuitry 222A, 222B, 222C may be disposed within the CPU 220A, the GPU 220B and the NPU 220C, respectively.

It should be appreciated that FIG. 2 shows one implementation of a possible SoC design, but there may be considerable variation in particular components included in the SoC. For instance, other units capable of requesting access to memory may also be included, such as display controllers, peripheral controllers, network controllers, etc.

Figure 3:
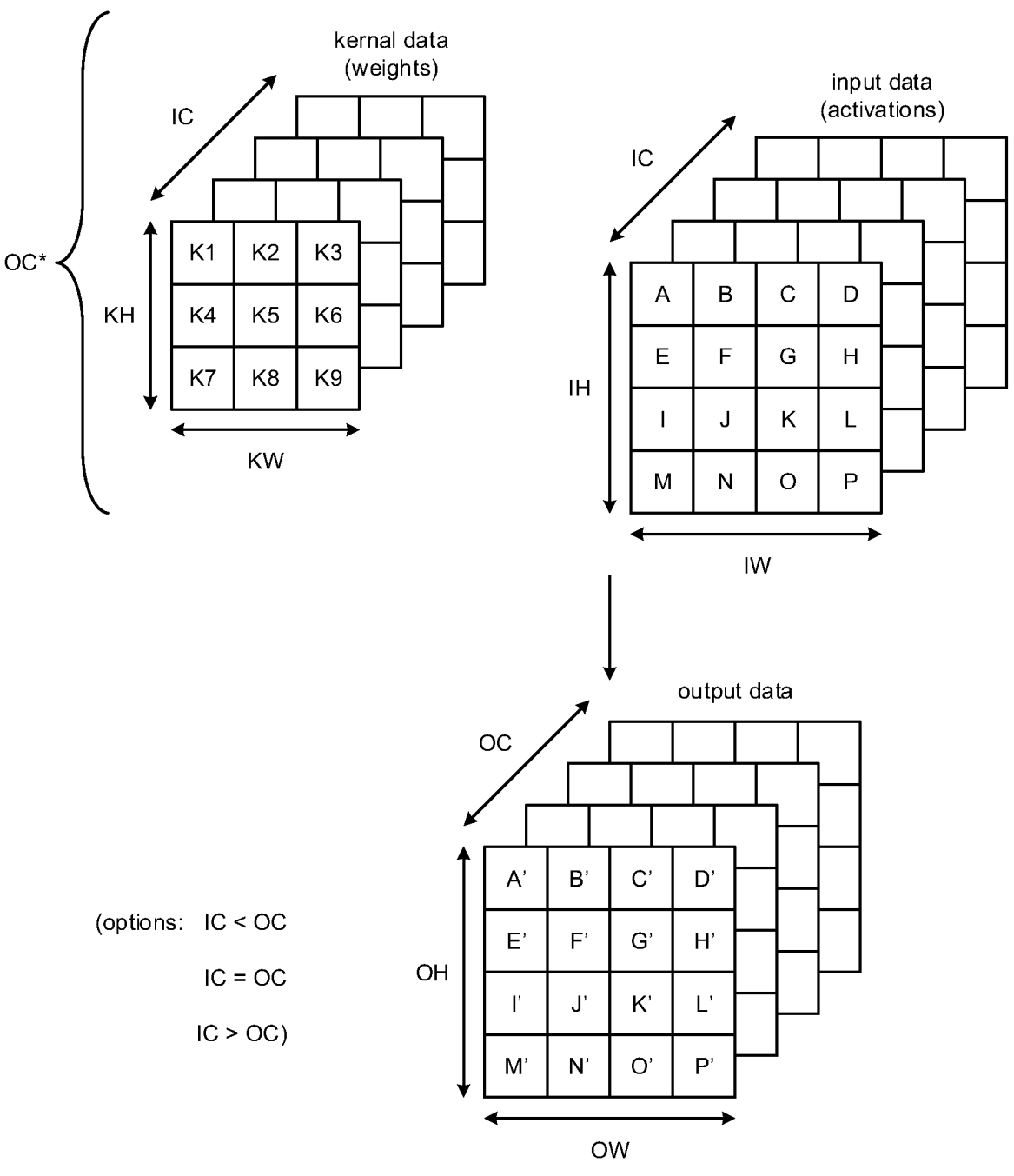
FIG. 3 illustrates a diagram of convolutional operations for a neural network in accordance with various implementations described herein.

FIG. 3 illustrates a graphical diagram 300 of convolutional operations 304 for a neural network in accordance with various implementations described herein. In some instances, convolutional neural networks may comprise a number of layers of processing, whereby data generated by one layer serves as an input to a next layer. FIG. 3 shows an instance of a convolutional operation that may be performed at any given layer in the neural network. The input data to that layer (also referred to as activations or input feature maps) may be defined as a number of input channels, wherein each input channel has a two-dimensional (2D) array of a particular size. In this instance, there may be a number of IC channels of the input data, wherein each channel has a height (IH) and width (IW), and also, in this instance, IH and IW are both equal to 4.

At a given layer of the neural network, the set of input data may be transformed into a corresponding set of output data having OC output channels, wherein each output channel has dimensions OH, OW. In this instance, OH and OW are also equal to 4 (e.g., similar to the input channels); however, this is not essential, and various other examples may change the channel height/width between the input and the output. Similarly, in this instance, the number of output channels OC is equal to the number of input channels IC; however, this is not essential, and OC may be greater than, equal to, or less than IC.

The function for transforming the input data into the output data is defined by a set of kernel data (or kernel weights). OC sets of IC arrays of kernel weights are defined (so that there are OC*IC arrays in total), and each output channel of output data is formed by processing corresponding ones of OC sets of kernel arrays and all IC input channels of activations. In this instance, each kernel array has KH*KW kernel weights, and KH and KW are both equal to 3. Thus, in total, there are OC*IC*KH*KR kernel weights.

In some implementations, the convolution operation is explained first assuming that IC=1 and OC=1, so that there is only a single kernel array comprising kernel weights K1 to K9, a single input channel comprising input activations A to P and a single output channel comprises output data A' to P' as labelled in FIG. 3. If IC=1, each element of output data channel may be formed by multiplying the respective kernel weights by the corresponding input activations which are at positions at which the kernel array elements would be positioned if the central kernel weight K5 was positioned over the input data element at the corresponding position to the output data element being generated. For instance, when generating output element F', the kernel array may be logically considered to be positioned over input channel data so that the central kernel element K5 is positioned over the input activation F, which corresponds in position to the output element F' being generated, and this means the other kernel weights K1, K2, K3, K4, K6, K7, K8, K9 would be positioned over input activations A, B, C, E, G, I, J, K, respectively. Hence, respective multiplications of kernel weights and input activations are performed, to add K1*A+K2*B+K3*C+K4*E+K5*F+K6*G+K7*I+K8*J+K9*K=F'. Thus, positions are multiplied with each kernel array element that depends on the relative position of these other input activations neighboring input activation at positions of the output element being calculated for the output array. Similarly, when calculating output element G', the kernel array may be shifted in position and now the multiplications and sums performed may be to generate G'=K1*B+K2*C+K3*D+K4*F+K5*G+K6*H+K7*J+K8*K+K9*L. In some cases, the result from the convolution (e.g., F' or G') may be added to a bias, and/or an activation function (e.g., ReLU, Sigmoid, etc.) may also be applied.

Similar calculations may be performed for each other position within the output channel. When calculating output elements that are near the edges of the output channel, the kernel array may be positioned with central element K5 over the corresponding input activation position, and some of the elements of the kernel array may extend past edges of the input channel. In a padded convolution, instead of multiplying these kernel weights by an input value derived from the input feature map, kernel weights that extend outside the input channel boundary may be multiplied by a padding value such as 0. Alternatively, an unpadded convolution may not calculate any output elements A', B', C', D', E', H', I', L', M', N', O', P' etc., which are at positions that need the kernel array to extend beyond the bounds of the input channel, and may only produce output data for those positions F', G', J', K', wherein the kernel may fit entirely within the bounds of the input channel (in this case, output channel dimensions may be less than input channel dimensions).

When this operation is scaled up to multiple input channels (IC>1), then there are IC channels of activations and IC arrays of kernel weights (with 1:1 mapping between activation channels and kernel weight arrays), and so single-channel operation described above may be performed for each respective pair of activation channel and corresponding kernel array, and results obtained for the same position within each set of multiplications added together to form a corresponding element of a single output channel. For instance, the value at position F' in the output channel shown in FIG. 3 may correspond to the sum of the value for position F' resulting from the convolution between kernel array 0 and input data channel 0, plus the value obtained for position F' by convolving kernel array 1 with input data channel 1, plus the value obtained for position F' by convolving kernel channel 2 with input channel 2, and so on until all input channels IC have been processed (the additions do not necessarily need to be performed in this order, and it may be possible to rearrange the processing to generate equivalent results).

If the number of output channels is scaled up to be greater than 1, then each output channel may be generated by applying the convolution operation described above to the IC input channels. However, this may be achieved using a different one of the OC sets of the IC kernel channels applied to the IC input channels.

FIG. 3 shows the processing of a 4×4 chunk of the input activation data for a given layer of the neural network. In practice, input data for a given layer may include an array of data of much wider dimensions and there may be many kernels. Also, the neural network as a whole may comprise many layers, so that the output channels from one layer serve as inputs to the next, with different sets of kernel weights learnt by machine learning to provide different transformation functions at different nodes of a neural network. Thus, it may be seen that such neural network as a whole may need an extremely large number of multiplications between different pairs of kernel weights and input activations along with additions of these products. The kernel weights and activation values may be multiplied together in many different combinations. For instance, a given activation A may need to be multiplied by many different kernel weights and a given kernel weight K1 may need to be multiplied with many different activation values. To speed up processing, kernel weight data and input activation data may be laid out in memory in structures in a different logical format to the format shown in FIG. 3. For instance, data structures may be structured to allow the multiplications and the accumulations needed for a certain layer of the neural network processing to be implemented by performing matrix multiplications, which may be split into simpler operations, such as, e.g., vector outer product operations or vector dot product (or "inner product") operations.

The neural network processing may be implemented in different ways, such as, e.g., using general purpose CPU instructions executed by the CPU 220A, or by GPU instructions executed by the GPU 220B, or by MAC operations performed using the MAC units 250 of the NPU 220C. Regardless of which processing unit performs the processing, an iterative process may be applied in which chunks of input data and kernel weight data are repeatedly loaded from memory 238, 248, 262, 264 to the registers 230, 240 or data buffers 254, series of matrix multiplication operations (e.g., decomposed into vector outer product operations or dot product operations) are performed on loaded chunks of data, and results are written back to matrix structures in memory 238, 248, 262, 264.

In various scenarios, some neural networks (NN) refer to convolutional neural networks (CNN), which may have a large number of convolutional layers that typically comprise >95% of network processing. Therefore, CNN processing may involve a large number of multiply and accumulate (MAC) operations applied on Input Feature Maps (IFMs) and Weight/Kernel data. A significant amount of weight data comprises of 0's or small values. This information may be known in advance, so a compiler may write sparsity information as metadata when writing weights to memory, such as, e.g., DRAM (Dynamic Random Access Memory). Similarly, some IFMs may have a significant amount of Os and small values. For bandwidth savings, some implementations take advantage of these Os and small values by compressing both weight data and IFM data. The size of compressed data may be written to DRAM as metadata. CNNs tend to involve a large amount of data reuse, as a given IFM element may be multiplied with many different kernel weights, and the given kernel weight multiplied with many different IFM elements, so the overhead of computing any metadata about properties of the input data can be shared over a large number of instances of reusing the same input data. These properties of CNN processing result in workloads that are substantially well suited to the consideration of input-data-dependent metadata for controlling power management policy.

Therefore, the estimated energy need for processing neural network operations may depend on the nature of input data and, in particular, on factors such as the sparsity, the level of compression, numeric range or distribution of numeric values, or inter-element differences between numeric values within the input data. Performing CNN processing on one input data set or with one set of kernel weights may consume more power than performing a similar CNN processing operation on a different input set or with different kernel weights. By taking metadata that indicates a property of the input data into account when deciding power management policy, more efficient decisions may be made on how much power budget to request and how best to use the available power budget.

Figure 4:
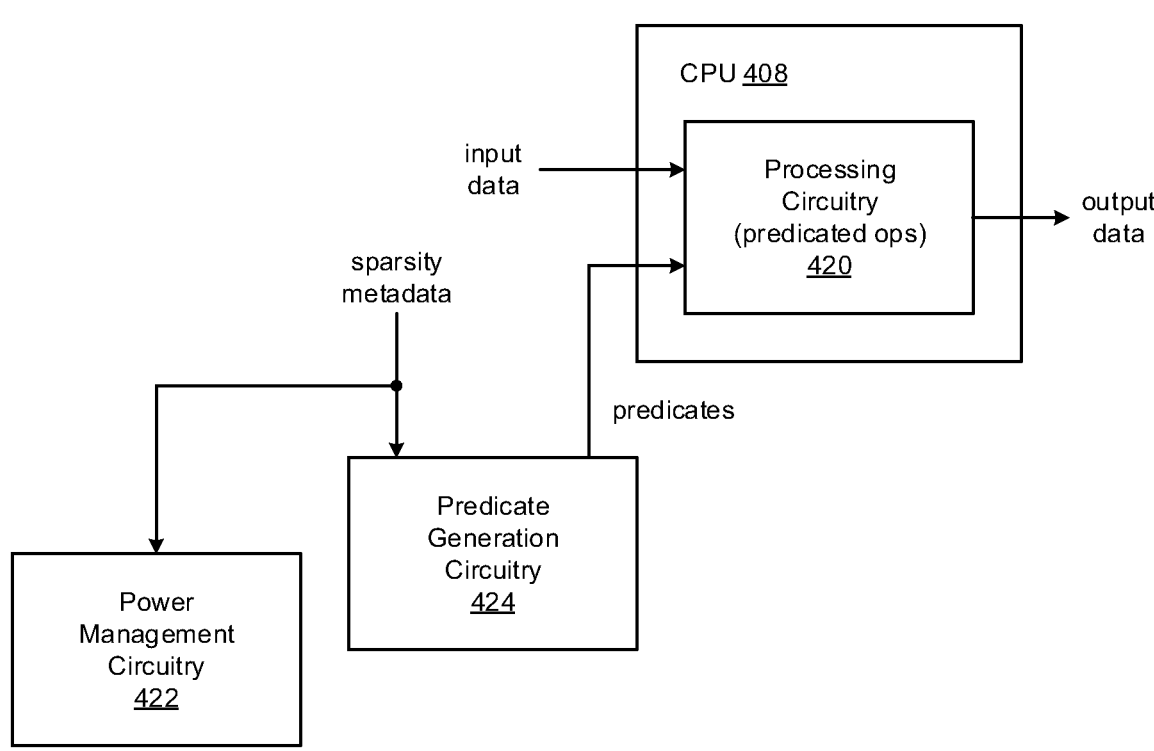
FIG. 4 illustrates a diagram of metadata processing circuitry in accordance with various implementations described herein.

FIG. 4 illustrates a schematic diagram 400 of metadata processing circuitry 404 in accordance with various implementations described herein.

As shown in FIG. 4, metadata processing circuitry 404 may include hardware circuit logic that supports the use of sparsity metadata so as to powergate hardware circuit units. For instance, CPU 408 may be designed for general purpose processing and may not have support for consideration of sparsity metadata relating to input data for the neural network (NN). However, CPU 408 may have vector processing circuitry 420 that receives a predicate value as input so as to control masking of processing of certain elements of a vector operand. As such, predicate generation circuitry 424 may be provided to convert the sparsity metadata into predicates that are supplied to CPU 408 to control predication of vector operations, which may allow for further power savings at the CPU based on the sparsity metadata. The predication generation circuitry 424 may be a dedicated hardware circuit logic unit, or may be one of the processing units 222A, 222B, 222C that executes software for controlling generation of predicates based on the sparsity metadata. As such, converting sparsity metadata into predicates may allow the CPU 408 or other processing unit 222B, 222C (that may not be specifically designed to handle sparse matrices) to be processed in a neural network to save power when possible. This reduces the number of bit value transitions so as to reduce dissipation of power. Also, sparsity metadata may be supplied to the power management circuitry 422 so that the sparsity of the input data sets are taken into account for controlling power management policy.

In some implementation, the sparsity metadata may be used to actively control power consumption at the CPU 408 (e.g., by power-gating unneeded circuit elements or suppression of unnecessary processing operations); however, this is not essential, and various other forms of processing circuitry that processes input data in a similar manner, regardless of the metadata, may also be used. Even in that scenario, supplying metadata to the power management circuitry 422 for controlling power management policy may be useful in that the metadata may be used to deduce that one set of input data may be more power efficient to process than another set of input data. For instance, a sparser data set or a data set with a smaller numeric range of data values may involve less toggling of bits between 0 and 1), which may result in a more power efficient operations.

Figure 5:
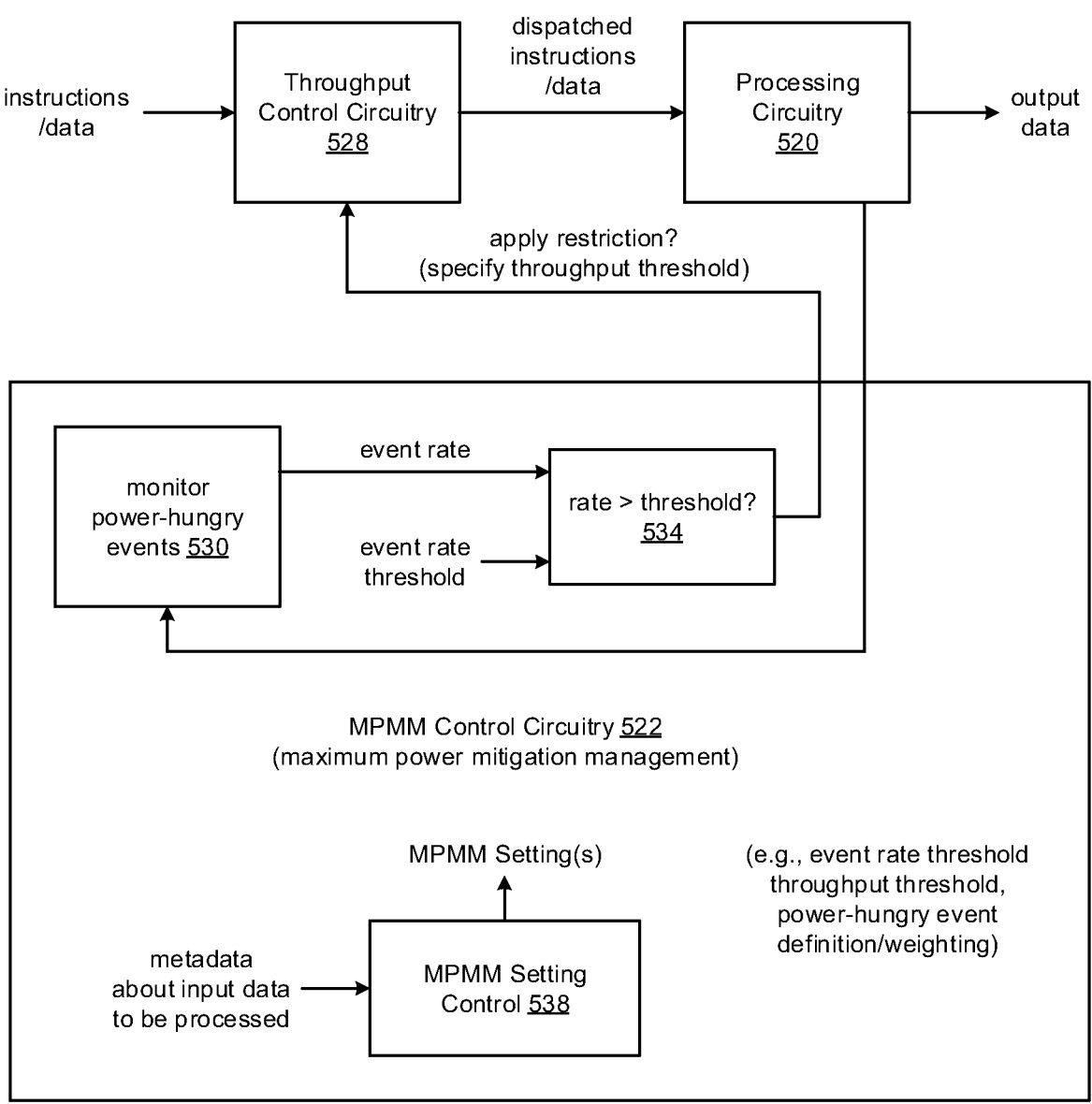
FIG. 5 illustrates a diagram of power management policy control circuitry in accordance with various implementations described herein.

FIG. 5 illustrates a diagram 500 of power management policy control circuitry 504 in accordance with various implementations described herein.

In some implementations, as shown in FIG. 5, the power management policy control circuitry 504 may include throughput control circuitry 528 and processing circuitry 520, such as, e.g., CPU 222A, GPU 222B or NPU 222C. Also, the power management policy control circuitry 504 may use power management circuitry 522 for maximum power mitigation management (MPMM). In some scenarios, the power management policy may refer to a maximum power mitigation management (MPMM) policy with one or more power management features that detects and/or limits high energy events, such as, e.g., current spikes. In some instances, the power management feature may be configured to count a number of high energy events over an evaluation period so as to keep a rolling average across time. If the rolling average exceeds a pre-defined threshold, then the MPMM policy may throttle the throughput of the processing circuitry 222A, 222B, 222C, e.g., by throttling dispatch of processing operations or instructions or dispatch of input data to be processed, or by reducing clock frequency. Also, the MPMM policy may indicate when more energy is needed and submit an appropriate request to the regulator. If the workload needs more energy, then the MPMM policy may determine this in advance and put in a request to the regulator so as to match the (expected) energy requirement to the energy request. Also, the MPMM policy may provide a number of "gears" or modes of operations, wherein each instruction has a different triggering threshold and needs throttling boundaries.

In some MPMM schemes, control of power management policy may be based on monitoring high energy events that have occurred during the operation of the SoC, but may not consider a property of input data that will be processed in a forthcoming period of time. However, with the instance shown in FIG. 5, metadata about the input data may be taken into account for controlling the MPMM policy.

In some implementations, the power management circuitry 522 may implement the MPMM policy with monitoring circuitry 530 for monitoring occurrence of certain power-hungry events occurring on the SoC, such as, e.g., certain types of processing operations and/or instructions that are expected to drain power or cause interrupts/exceptions. The monitoring circuitry 530 may detect power hungry events based on signals received from the processing circuitry 520 indicating the occurrence of these power-hungry events. The frequency of these high energy events may be evaluated across a number of evaluation periods of a given length, and a rolling average may be kept over time, so as to generate a metric representing the rate of power-hungry events. Different MPMM modes may have different ways of calculating event rate metrics, such as counting different types of events, or assigning different weights to particular events in order to decide how they contribute to the overall metric indicative of power-hungry event rates. Regardless of the particular way in which the metric is generated, comparison logic 534 may compare the event rate metric with a certain threshold, and the comparison may be used to determine whether to apply a restriction in the throughput of instructions or data processed by the processing circuitry 520 (e.g., CPU 222A, GPU 222B or NPU 222C, as described herein).

The power management circuitry 522 may have MPMM setting control circuitry 538 that uses metadata related to the input data and/or instructions to be processed by the processing circuitry 520 so as to control the MPMM settings. The controlled settings may include, e.g., an event rate threshold compared against an event rate metric to decide whether to apply a restriction in throughput, or a throughput threshold which represents a limit beyond which further instructions or data should not be dispatched to the processing circuitry 520. For example, throughput control logic 86 may be provided in association with the processing circuitry 520 to monitor the rate of data and/or instructions that have been dispatched to the processing circuitry 520 within a given period so that a flow of the data and/or instructions may be halted or reduced if a restriction needs to be applied to limit energy consumption based on monitoring of the power-hungry events by the monitoring circuitry 530. Also, MPMM settings may include the definition of the power-hungry events to be monitored and the weighting that is assigned to particular events when determining the event rate metric. Also, other settings may be controlled based on the metadata about the input data and/or instructions to be processed. In some cases, rather than individually selecting a number of different settings based on the metadata, the MPMM setting control 538 may shift the MPMM policy between different predefined modes or gears, to implicitly select a corresponding set of settings based on the selected mode.

For instance, when an SoC is running a machine learning workload for a neural network, the power management circuitry 522 may use data values and/or instructions for MPMM throttling. The processing circuitry 520 on which this workload is being run may be the CPU 222A, GPU 222B and/or NPU 222C. MPMM is not the only form of power management policy that may be influenced by metadata associated with input data and/or instructions to be processed in machine learning workloads. Other types of management policy may also be controlled based on metadata, such as dynamic voltage or frequency scaling, requests to a voltage regulator for supply of more or less voltage, as well as a scheme for limiting the rate of change of power requirements by monitoring differences over time of expected power requirements and taking action to smooth changes in power demand when required, e.g., by either throttling the dispatch of data or instructions to the processing circuitry 520. In other scenarios, if activity switches from a high level to a low level quickly, then dummy operations and/or instructions may be added in a processing pipeline so as to be processed to maintain a certain minimum level of power or to reduce the rate of change of power requirement over time.

Also, it is not essential for the workload for which the metadata is used to control power management to be a machine learning workload. Various other schemes may be used in other instances, such as, e.g., video encode/decode, image processing, display processing, graphics processing, etc. Compression metadata may be used to determine the amount of energy needed to process a region of the data/image. These other types of workloads may vary in power demands based on the nature of specific input data being processed and so may also benefit from the schemes discussed herein.

Various implementations described herein provide for current spike mitigation techniques to prevent supply droop: static scheduling and dynamic scheduling. In various implementations, static scheduling utilizes an off-line characterization of the graph (or NN workloads) so as to identify potential voltage droop events and subsequently modify the graph to mitigate these droop events. Also, in other implementations, dynamic scheduling monitors current demand during execution of the graph (or NN workloads) and utilizes this information to modify graph scheduling to mitigate potential droop events.

Figure 6:
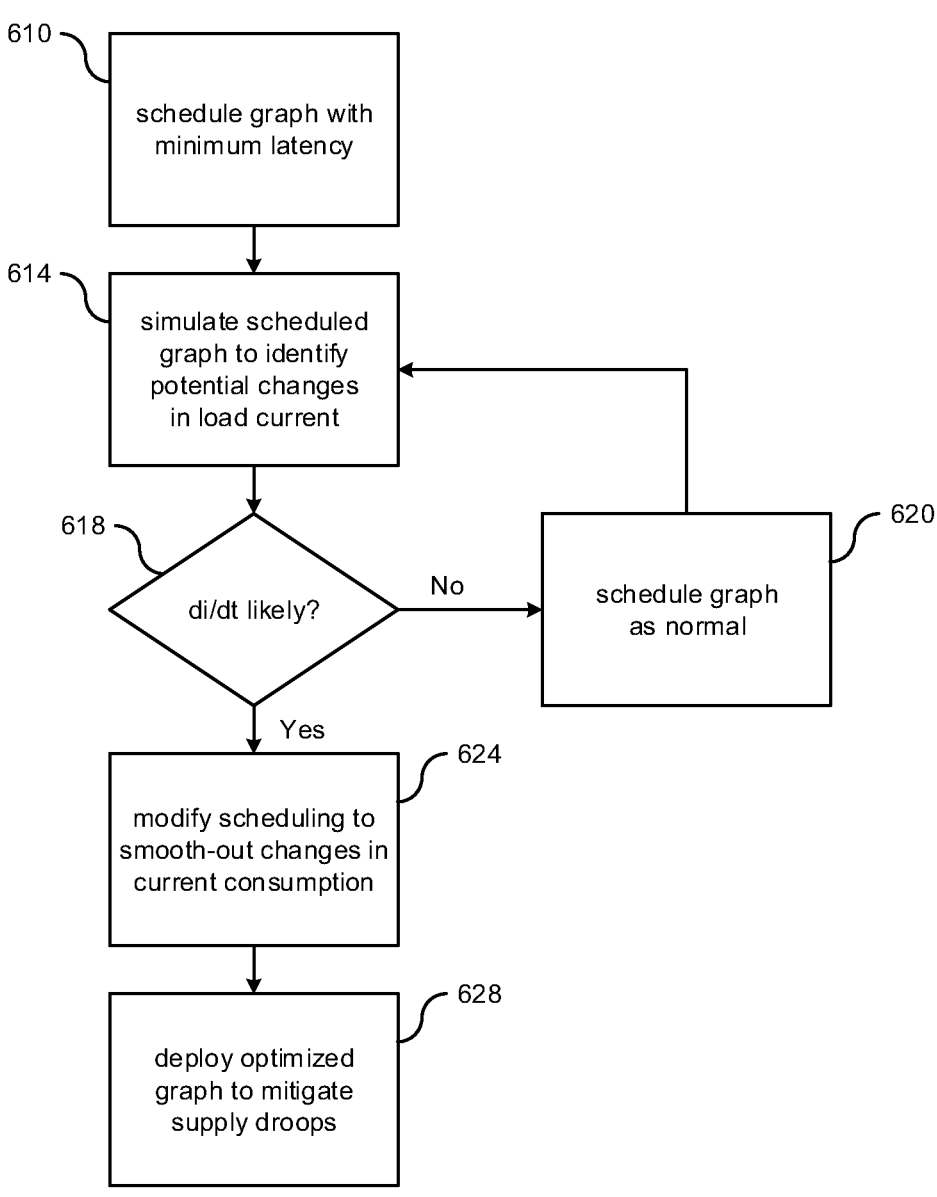
FIGS. 6-8 illustrate various diagrams of methods for current spike mitigation in neural networks in accordance with various implementations described herein.

FIG. 6 illustrates a diagram of a method 600 for current spike mitigation in neural networks in accordance with various implementations described herein. In some implementations, method 600 refers to a method for static scheduling of neural network (NN) workloads by utilizing current spike mitigation schemes and techniques.

It should be understood that even though method 600 indicates a particular order of operation execution, in some cases, portions of operations may be executed in a different order, and on different systems. In other cases, additional operations or steps may be added to and/or omitted from method 600. Also, method 600 may be implemented in hardware and/or software. For instance, if implemented in hardware, method 600 may be implemented with various components and/or circuitry, as described in FIGS. 1-5. In other instances, if implemented in software, method 600 is implemented as a program or software instruction process that provides various current spike mitigation schemes and techniques as described herein. Also, if implemented in software, instructions related to implementing method 600 may be stored and/or recorded in memory, such as, e.g., in a database. In some instances, a computer or various other types of computing devices with a processor and memory may be configured to perform method 600.

At block 610, method 600 may schedule the graph with minimum latency as the optimization goal. At block 614, method 600 may simulate the scheduled graph execution to identify potential changes in load current. In various implementations, there are multiple ways to achieve this. For instance, method 600 may use utilization as a proxy for current consumption, which refers to the most straight-forward approach that is a good approach for data-path-heavy NPUs. However, in some instances, this approach may not model data movement and storage among other things. Thus, in other instances, method 600 may use a power modeling approach to accurately model actual dynamic current draw, which may be more time consuming, but gives the most faithful result.

At decision block 618, method 600 may determine whether a di/dt event (e.g., rapid change in current or voltage) is likely. If no, then method 600 proceeds to block 620 so as to schedule the graph as normal, and method 600 may return to block 614 for further processing. If yes, then method proceeds to block 624 so as to modify scheduling of the graph to smooth-out changes in current consumption. In some instances, method 600 may modify scheduling of the graph so as to smooth-out changes in current consumption and to minimize potential voltage supply droop events. Therefore, method 600 may revisit the original latency-driven scheduling choices to see if there is an alternative schedule that avoids a given current consumption step, without significantly increasing latency. This approach may be restated as performing graph scheduling with joint constraints of minimizing both latency and rapid current steps. Otherwise, in other instances, if graph scheduling has already been performed, then method 600 may post-process the scheduled graph by inserting dummy nodes that have controlled/predictable current consumption. This is achieved by method 600 performing dummy operations or by invoking explicit hardware features for this specific purpose.

At block 628, method 600 may deploy an optimized graph to mitigate various di/dt events, such as, e.g., rapid voltage droops and/or current spikes. In some instances, since the graph has been optimized to mitigate voltage supply droops, method 600 may safely deploy the optimized graph scheduling on the target hardware.

In some implementations, static scheduling techniques for neural networks may refer to a method that is configured to monitor workloads of the neural network for current spikes and determine current transitions of workloads that result in rapid changes in load current consumption of the neural network. The method may also be configured to modify the load scheduling of the neural network to smooth and stabilize the current transitions of the workloads. The method may also be configured to monitor workload operations of workloads for current spikes, determine current transitions between workload operations that result in rapid changes in the load current consumption, and modify load scheduling of workload operations so as to smooth and stabilize the current transitions between the workloads. The method may be configured to schedule workloads of the neural network with minimal latency as an optimization goal by generating load scheduling of the neural network and simulating execution of the neural network to identify rapid changes in load current by executing the load scheduling of the neural network. The method may execute the load scheduling of the neural network by using a proxy for load current consumption of the neural network. Otherwise, the method may execute load scheduling of the neural network by using a power modelling approach to model dynamic current draw for the load current consumption of the neural network.

In some implementations, the method may modify load scheduling of the neural network to stabilize rapid changes in the load current consumption and minimize supply droop events of input voltage applied to the neural network. The method may schedule workloads of the neural network with minimal latency and with rapid load current spikes by generating the load scheduling of the neural network, and the method may simulate execution of the neural network by identifying latency-driven scheduling choices with an alternative load scheduling that avoids a given load current consumption step without significantly increasing latency. In some instances, the workloads may refer to workload operations, wherein alternative load scheduling provides the neural network with dummy operations inserted between the workload operations so as to thereby provide controlled and predictable load current consumption to the neural network. Also, the insertion of the dummy operations is achieved by performing dummy workload operations or by invoking explicit hardware features for the dummy operations.

Figure 7:
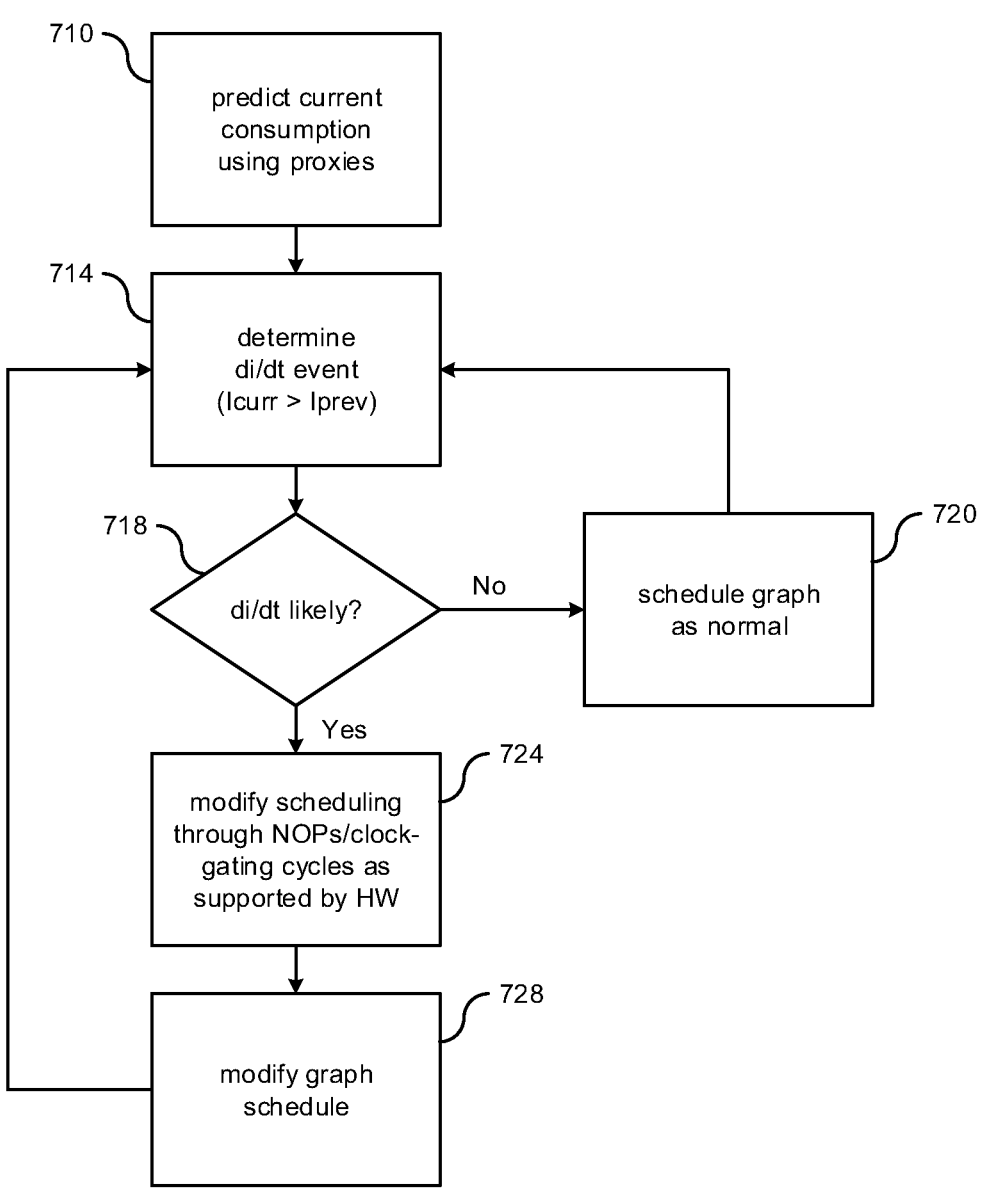

FIG. 7 illustrates a diagram of a method 700 for current spike mitigation in neural networks in accordance with various implementations described herein. In some instances, method 700 refers to a method for dynamic scheduling of neural network (NN) workloads by utilizing current spike mitigation schemes and techniques.

It should be understood that even though method 700 indicates a particular order of operation execution, in some cases, portions of operations may be executed in a different order, and on different systems. In other cases, additional operations or steps may be added to and/or omitted from method 700. Also, method 700 may be implemented in hardware and/or software. For instance, if implemented in hardware, method 700 may be implemented with various components and/or circuitry, as described in FIGS. 1-6. In other instances, if implemented in software, method 700 is implemented as a program or software instruction process that provides various current spike mitigation schemes and techniques as described herein. Also, if implemented in software, instructions related to implementing method 700 may be stored and/or recorded in memory, such as, e.g., in a database. In some instances, a computer or various other types of computing devices with a processor and memory may be configured to perform method 700.

In various implementations, the concept of modifying graph scheduling may be further applied during dynamic execution of the NN workload. This concept relies upon the estimation (or measurement) of current-demand of the execution unit at runtime and deliberate invocation of dummy operations, such as, e.g., no operations (NOPs) or clock-gating cycles, supported by the hardware.

At block 710, method 700 may predict current consumption using proxies. In some implementations, method 700 may use microarchitectural proxies to estimate the current consumption of NN workload execution units. In various instances, method 700 may be configured to generate proxies in an automated manner, or method 700 may be configured to use utilization-based proxies as estimators. In other instances, method 700 may read proxy values to identify current-transients that are precursors of di/dt events.

At block 714, method 700 may determine di/dt events, such as, e.g., whether the actual current (Icurr) is greater than the previous current (Iprev). At decision block 718, method 700 may determine whether a di/dt event (e.g., rapid change in current or voltage) is likely. If no, then method 700 proceeds to block 720 so as to schedule the graph as normal, and method 700 may return to block 714 for further processing. If yes, then method may proceed to block 724 so as to modify scheduling of the graph through NOPs/clock-gating cycles as supported by the target hardware (HW). Thus, method 700 may modify the pre-determined scheduling graph dynamically with deliberate insertion of NOP operations or clock-gating cycles supported by the hardware.

At block 728, method 700 may modify the graph schedule and/or deploy an optimized graph to mitigate various di/dt events, such as, e.g., rapid voltage droops and/or current spikes. In some instances, since the graph has been optimized to mitigate voltage supply droops, method 700 may safely deploy the optimized graph scheduling on target hardware (HW). Thus, in various implementations, method 700 may be used to provide dynamic scheduling by utilizing current estimation, di/dt prediction and hardware throttling mechanisms for scheduling modifications of the graph.

In various implementations, dynamic scheduling techniques for neural networks may refer to a method that is configured to monitor the workload operations of the neural network for current spikes, insert dummy operations between workload operations, and measure current-demand of the neural network to identify load current transitions between the workload operations and dummy operations that result in rapid changes in load current consumption of the neural network. The method may generate micro-architectural proxies to estimate load current consumption of the neural network and measure current-demand of the neural network by using the micro-architectural proxies to estimate the load current consumption of neural network. The method may generate the micro-architectural proxies to estimate load current consumption of the neural network and measure current-demand of the neural network by using the micro-architectural proxies to estimate the load current consumption of neural network. The method may modify the load scheduling of the neural network to smooth and stabilize the current transitions between workload operations and dummy operations. The method may modify the load scheduling of the neural network by dynamically modifying the load scheduling graph by deliberately inserting at least one of the dummy operations and clock-gating cycles supported by the neural network.

In some implementations, the method may use specialized hardware or similar circuitry to measure performance-penalties related to the dummy operations. The method may also use feedback control circuitry to adjust at least one of input voltage and a rate of dummy operations to meet runtime optimization objectives. Also, in various instances, for lower latency, input voltage may be temporarily increased over a predetermined time period so as to reduce latency while monitoring the current-demand peaks. Also, in other instances, for lower latency, operating frequency of the neural network may be reduced so as to thereby reduce power consumption of the neural network.

Figure 8:
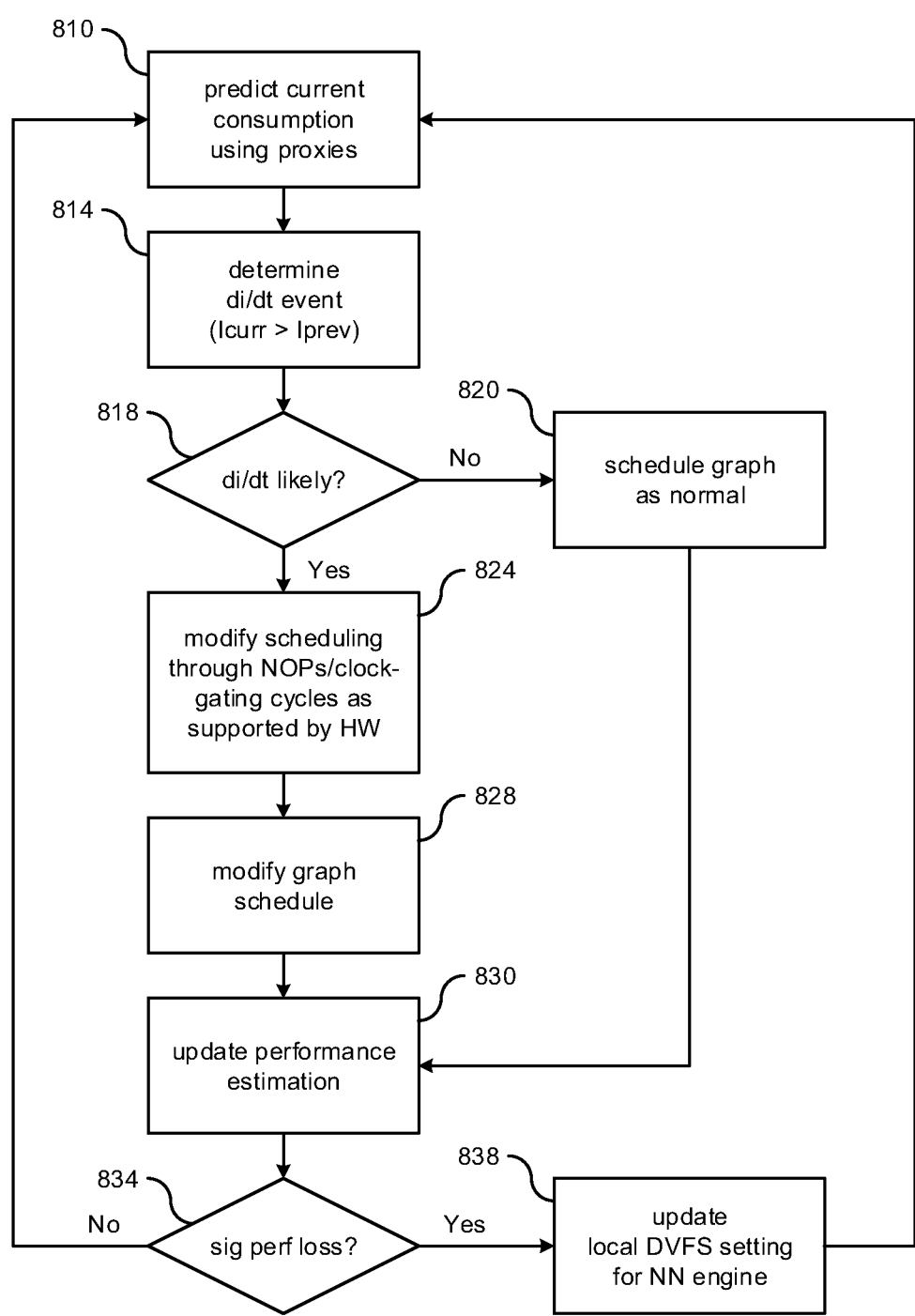

FIG. 8 illustrates a diagram of a method 800 for current spike mitigation in neural networks in accordance with various implementations described herein. In some instances, method 800 refers to a method for dynamic scheduling of neural network (NN) workloads by utilizing current spike mitigation schemes and techniques.

It should be understood that even though method 800 indicates a particular order of operation execution, in some cases, portions of operations may be executed in a different order, and on different systems. In other cases, additional operations or steps may be added to and/or omitted from method 800. Also, method 800 may be implemented in hardware and/or software. For instance, if implemented in hardware, method 800 may be implemented with various components and/or circuitry, as described in FIGS. 1-7. In other instances, if implemented in software, method 800 is implemented as a program or software instruction process that provides various current spike mitigation schemes and techniques as described herein. Also, if implemented in software, instructions related to implementing method 800 may be stored and/or recorded in memory, such as, e.g., in a database. In some instances, a computer or various other types of computing devices with a processor and memory may be configured to perform method 800.

In some implementations, insertion of dummy operations incurs a performance penalty that manifests as an increase in latency of activation computations. Specialized hardware may measure this performance-penalty and a feedback control mechanism may adjust supply voltage (VDD), maximum clock frequency (FMAX), and/or rate of dummy-operations to meet runtime optimization objectives. In some instances, if lower latency is needed, then VDD/FMAX may be temporarily increased so as to reduce latency while closely monitoring the current-demand peaks. Clearly, such "turbo-mode" operations may be sustained only for a small period. Conversely, if there are several invocations of dummy operations that may cause significant latency penalties, it may be more beneficial to reduce operating frequency of the NN engine that brings down the power-consumption, thereby making modifications to graph scheduling unnecessary. In various instances, the term FMAX may refer to the maximum clock frequency that hardware and/or any related support circuitry related thereto is able to correctly or properly operate.

At block 810, method 800 may predict current consumption using proxies. In some implementations, method 800 may use microarchitectural proxies to estimate the current consumption of NN workload execution units. In various instances, method 800 may be configured to generate proxies in an automated manner, or method 800 may be configured to use utilization-based proxies as estimators. In other instances, method 800 may read proxy values to identify current-transients that are precursors of di/dt events.

At block 814, method 800 may determine di/dt events, such as, e.g., whether the actual current (Icurr) is greater than the previous current (Iprev). At decision block 818, method 800 may determine whether a di/dt event (e.g., rapid change in current or voltage) is likely. If no, then method 800 proceeds to block 820 to schedule the graph as normal, and method 800 may proceed to block 830 for further processing. If yes, then method may then proceed to block 824 so as to modify scheduling of the graph through NOPs/clock-gating cycles as supported by the target hardware (HW). Thus, method 800 may modify the pre-determined scheduling graph dynamically with deliberate insertion of NOP operations or clock-gating cycles supported by the hardware.

At block 828, method 800 may modify the graph schedule and/or deploy an optimized graph to mitigate various di/dt events, such as, e.g., rapid voltage droops and/or current spikes. In some instances, since the graph has been optimized to mitigate voltage supply droops, method 800 may safely deploy the optimized graph scheduling on target hardware (HW). Thus, in various implementations, method 800 may be used to provide dynamic scheduling by utilizing current estimation, di/dt prediction and hardware throttling mechanisms for scheduling modifications of the graph.

At block 830, method 800 may update the performance estimation of the graph scheduling. At decision block 834, method 800 may determine whether there has been significant performance loss of the NN workloads. If no, then method 800 may return to block 810 for further processing, e.g., so as to restart predicting current consumption using proxies. If yes, then method 800 may proceed to block 838 to update local DVFS setting (Dynamic Voltage Frequency Scaling settings) for the neural network (NN) engine. From block 838, method 800 may return to block 810 for further processing, e.g., so as to restart predicting current consumption using proxies. Thus, in various implementations, method 800 may be used to provide a dynamic scheduling flow-chart that considers performance impact with DVFS in the scheduling loop of the graph.

In some implementations, max-power mitigation methodology (MPMM) refers to a method for peak-power control in CPUs. One idea in MPMM is to estimate the power averaged over many cycles (e.g., 128 cycles) and then invoke throttling mechanisms to limit this peak-power. Various current spike mitigation techniques described herein may be applied to NN graph computation in different manner from MPMM, such as, e.g., by applying NN graph computation in the static-sense to take advantage of the scheduling graph known at network design time. Also, in some instances, the NN graph computation may be applied during dynamic scheduling for di/dt mitigation of di/dt events that develop over a short time duration (e.g., ~10 cycles), which may be much faster than MPMM time-windows. Also, various current spike mitigation techniques described herein may extend to addressing MPMM-style sustained peak-power mitigation as well by adjusting the time-windows over which scheduling decisions are made. Thus, the same scheme may extend to an MPMM-style equivalent for NN engines. Moreover, various current spike mitigation techniques described herein may be varied, e.g., by adjusting the time-window over which scheduling decisions are taken. For instance, by taking current estimation readings that are averaged over multiple time windows, these readings may enable the same scheme to implement the equivalent of MPMM for neural network computations.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a method. The method may monitor workloads of a neural network for current spikes, and the method may determine current transitions of the workloads that result in rapid changes in load current consumption of the neural network. The method may modify load scheduling of the neural network to smooth and stabilize the current transitions of the workloads.

Described herein are various implementations of a method. The method may monitor workload operations of a neural network for current spikes, and the method may insert dummy operations between the workload operations. The method may measure current-demand of the neural network to identify load current transitions between the workload operations and the dummy operations that result in rapid changes in load current consumption of the neural network.

Described herein are various implementations of a device. The device may have processing circuitry that executes workloads for a neural network, and the device may have power management circuitry that monitors the workloads of a neural network for current spikes. The power management circuitry may determine current transitions of the workloads that result in rapid changes in load current consumption of the neural network. The power management circuitry may modify load scheduling of the neural network to smooth and stabilize the current transitions of the workloads.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   monitoring workloads of a neural network for current spikes;

determining current transitions of the workloads that result in a current step or spike in load current consumption of the neural network; and modifying load scheduling of the neural network to smooth and stabilize the current transitions of the workloads.

2. The method of claim 1, further comprising:

monitoring workload operations of the workloads for current spikes, determining current transitions between the workload operations that result in the current step or spike in the load current consumption; and modifying load scheduling of the workload operations to smooth and stabilize the current transitions between the workloads.

3. The method of claim 1, further comprising:

scheduling workloads of the neural network with minimal latency as an optimization goal by generating the load scheduling of the neural network; and simulating execution of the neural network to identify the current step or spike in load current by executing the load scheduling of the neural network.

4. The method of claim 3, wherein:

executing the load scheduling of the neural network is performed by using a proxy for load current consumption of the neural network.

5. The method of claim 3, wherein:

executing the load scheduling of the neural network is performed by using a power modelling approach to model dynamic current draw for load current consumption of the neural network.

6. The method of claim 1, wherein:

modifying the load scheduling of the neural network stabilizes the current step or spike in the load current consumption and minimizes supply droop events of input voltage applied to the neural network.

7. The method of claim 6, further comprising:

scheduling the workloads of the neural network with minimal latency and with load current spikes by generating the load scheduling of the neural network; and simulating execution of the neural network by identifying latency-driven scheduling choices with an alternative load scheduling that avoids a given load current consumption step without significantly increasing latency.

8. The method of claim 7, wherein:

the workloads include workload operations, the alternative load scheduling provides the neural network with dummy operations inserted between the workload operations so as to provide controlled and predictable load current consumption to the neural network, and the insertion of the dummy operations is achieved by performing dummy workload operations or by invoking explicit hardware features for the dummy operations.

9. A device comprising:

processing circuitry that executes workloads for a neural network; and power management circuitry that:

monitors the workloads of a neural network for current spikes;

determines current transitions of the workloads that result in a current step or spike in load current consumption of the neural network; and modifies load scheduling of the neural network to smooth and stabilize the current transitions of the workloads.

10. The device of claim 9, wherein the power management circuitry:

schedules workloads of the neural network with minimal latency as an optimization goal by generating the load scheduling of the neural network;

simulates execution of the neural network to identify the current step or spike in load current by executing the load scheduling of the neural network; and stabilizes the rapid changes in the load current consumption so as to reduce supply droop events of input voltage applied to the neural network.

11. The device of claim 9, wherein the power management circuitry:

schedules the workloads of the neural network with minimal latency and with load current spikes by generating the load scheduling of the neural network; and simulates execution of the neural network by identifying latency-driven scheduling choices with an alternative load scheduling that avoids a given load current consumption step without significantly increasing latency.

12. The device of claim 11, wherein:

the workloads include workload operations, the alternative load scheduling provides the neural network with dummy operations inserted between the workload operations so as to provide controlled and predictable load current consumption to the neural network, and the insertion of the dummy operations is achieved by performing dummy workload operations or by invoking explicit hardware features for the dummy operations.

* * * * *